(12) United States Patent
Iwamoto et al.

(10) Patent No.: US 12,125,635 B2
(45) Date of Patent: Oct. 22, 2024

(54) SUPERCONDUCTING ELECTROMAGNET

(71) Applicant: Canon Medical Systems Corporation, Tochigi (JP)

(72) Inventors: Naoki Iwamoto, Tokyo (JP); Tomonori Tanaka, Tokyo (JP); Tatsuya Inoue, Tokyo (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 383 days.

(21) Appl. No.: 17/608,151

(22) PCT Filed: Jul. 10, 2019

(86) PCT No.: PCT/JP2019/027271
§ 371 (c)(1),
(2) Date: Nov. 2, 2021

(87) PCT Pub. No.: WO2021/005732
PCT Pub. Date: Jan. 14, 2021

(65) Prior Publication Data
US 2022/0293317 A1   Sep. 15, 2022

(51) Int. Cl.
*H01F 6/04* (2006.01)
*G05D 7/01* (2006.01)
*H01F 6/06* (2006.01)

(52) U.S. Cl.
CPC ............. *H01F 6/04* (2013.01); *G05D 7/0133* (2013.01); *H01F 6/06* (2013.01)

(58) Field of Classification Search
CPC ........... G05D 7/0133; H01F 6/02; H01F 6/04; H01F 6/06
See application file for complete search history.

(56) References Cited

U.S. PATENT DOCUMENTS

| | | | | |
|---|---|---|---|---|
| 2009/0277517 | A1* | 11/2009 | Mann | F25D 29/001 324/318 |
| 2009/0280989 | A1* | 11/2009 | Astra | G05D 23/1919 62/51.1 |
| 2015/0027559 | A1* | 1/2015 | Retz | F16K 17/16 137/68.19 |

FOREIGN PATENT DOCUMENTS

| | | |
|---|---|---|
| JP | 5-55032 A | 3/1993 |
| JP | 07161522 A * | 6/1995 |
| JP | 08181359 A * | 7/1996 |

OTHER PUBLICATIONS

International Search Report and Written Opinion mailed on Sep. 17, 2019, received for PCT Application PCT/JP2019/027271, Filed on Jul. 10, 2019, 8 pages including English Translation.

* cited by examiner

*Primary Examiner* — Eric S Ruppert
*Assistant Examiner* — Hans R Weiland
(74) *Attorney, Agent, or Firm* — XSENSUS LLP

(57) ABSTRACT

A part of a second split-flow pipe is branched into at least a first branch pipe and a second branch pipe. A second spring check valve is disposed in the first branch pipe to open when a pressure difference between an upstream side and a downstream side of the second spring check valve in the first branch pipe becomes more than or equal to a second set pressure higher than a first set pressure. A third spring check valve is disposed in the second branch pipe to open when a pressure difference between an upstream side and a downstream side of the third spring check valve in the second branch pipe becomes more than or equal to a third set pressure higher than the first set pressure. The second branch pipe is different from the first branch pipe in terms of at least one of diameter, length, and inner volume.

12 Claims, 5 Drawing Sheets

FIG.2 - Comparative Art
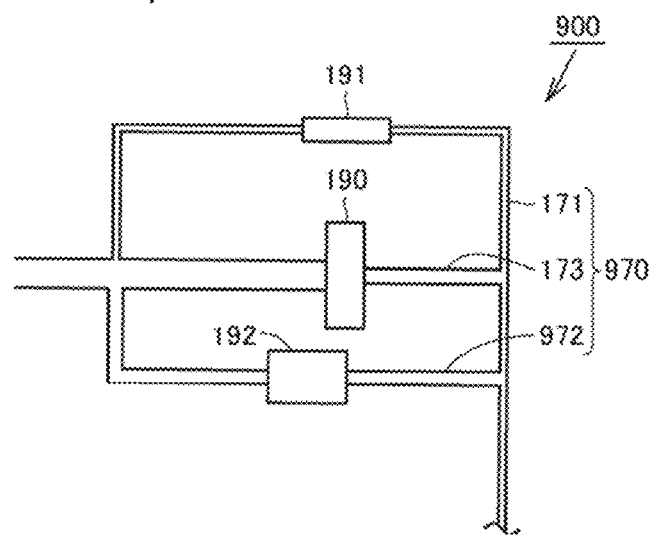
FIG.3 - Comparative Art
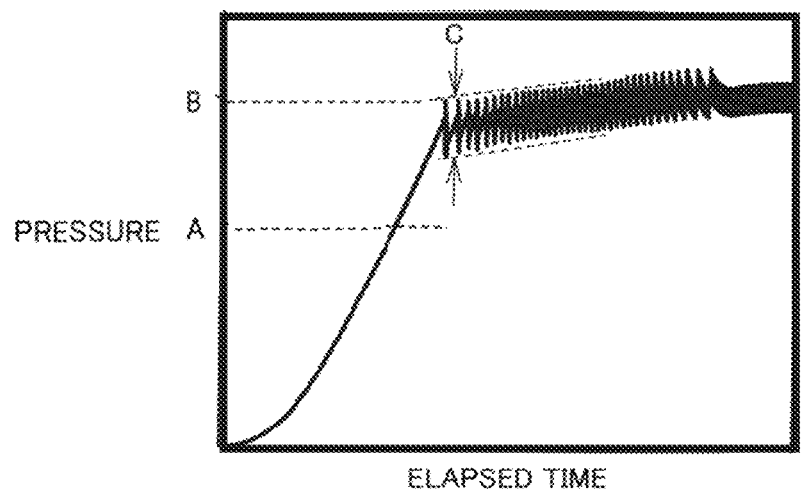

FIG.4 - Comparative Art
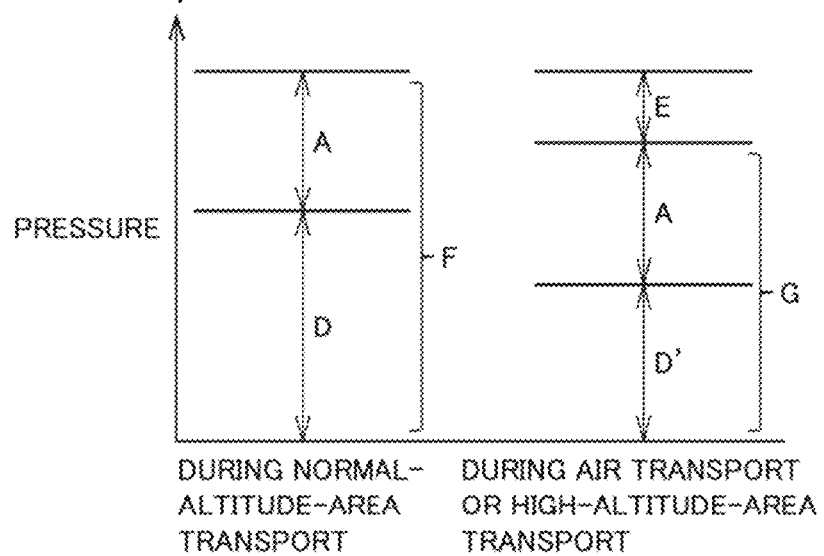
FIG.5
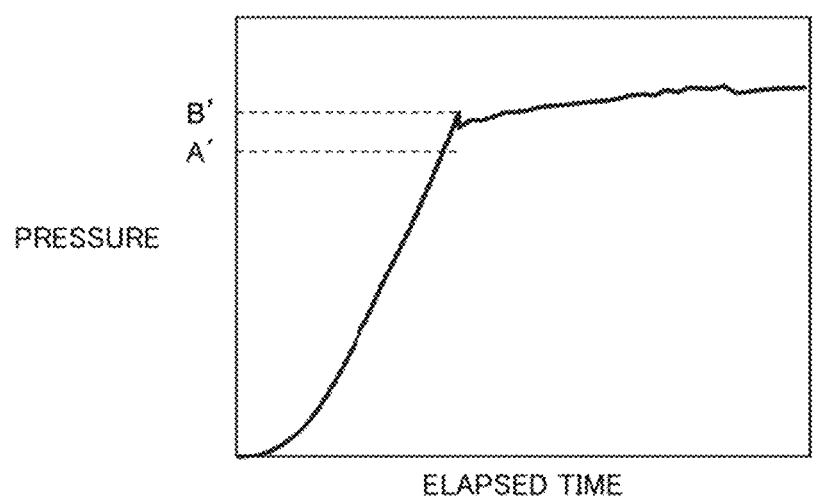

SUPERCONDUCTING ELECTROMAGNET

CROSS-REFERENCE TO RELATED APPLICATION

The present application is based on PCT filing PCT/JP2019/027271, filed Jul. 10, 2019, the entire contents of which are incorporated herein by reference.

TECHNICAL FIELD

The present invention relates to superconducting electromagnets.

BACKGROUND ART

A prior document, Japanese Patent Laying-Open No. H05-55032 (PTL 1) discloses a configuration of a superconducting electromagnet. The superconducting electromagnet disclosed in PTL 1 includes an inner vessel, an outer vessel, a discharge channel, a safety valve, an inner-pressure keeping valve, and an on-off valve. The inner vessel contains a superconducting coil and coolant. The outer vessel holds the inner vessel in the outer vessel. The discharge channel is branched into a first branch pipe, a second branch pipe, and a third branch pipe. The safety valve is disposed in the first branch pipe. The safety valve will not be opened as long as the superconducting electromagnet keeps a normal superconducting state. The inner-pressure keeping valve is configured in the form of a spring check valve and disposed in the second branch pipe. When a quench of the superconducting electromagnet occurs, the inner-pressure keeping valve is opened to discharge coolant gas. The on-off valve is disposed in the third branch pipe. The on-off valve is closed all the time except that when coolant is fed.

CITATION LIST

Patent Literature

PTL 1: Japanese Patent Laying-Open No. H05-55032

SUMMARY OF INVENTION

Technical Problem

When a quench of a superconducting electromagnet occurs, an enormous amount of coolant gas is generated in a short time. In a superconducting electromagnet having coolant gas discharged through a single spring check valve, like the superconducting electromagnet disclosed in PTL 1, the speed at which the spring check valve is opened is slower than the speed at which coolant gas is generated, and therefore, the pressure in the inner vessel instantaneously attains a peak pressure. After the peak pressure is reached, a pressure variation occurs in the inner vessel, i.e., a pressure decrease resultant from opening of the spring check valve and a pressure increase resultant from closing of the spring check valve in response to the pressure decrease are alternately repeated. The peak pressure and the maximum pressure of the pressure variation have to be kept less than or equal to an allowable pressure of the inner vessel, and therefore, the set pressure, which is a spring force when the spring check valve starts opening, cannot be set high.

The spring check valve is caused to open when the pressure in the inner vessel becomes larger than the sum of the spring force of the spring check valve and the outside air pressure. Specifically, the set pressure for the spring check valve is the spring force when the spring check valve is closed. The outside air pressure of a high-altitude area is lower than the outside air pressure of a normal-altitude area. Therefore, if, during air transport or high-altitude-area transport of the superconducting electromagnet, the pressure in the inner vessel becomes larger than the sum of the set pressure for the spring check valve and the outside air pressure of the high-altitude area, the spring check valve is opened. As a result, the amount of evaporated coolant increases during air transport or high-altitude-area transport of the superconducting electromagnet. If the set pressure for the spring check valve is lower, the amount of evaporated coolant further increases.

The present invention has been made in view of the above problem, and an object of the present invention is to provide a superconducting electromagnet that enables reduction of the amount of evaporated coolant during air transport or high-altitude-area transport while reducing the maximum pressure in the inner vessel.

Solution to Problem

A superconducting electromagnet according to the present invention includes an inner vessel, an outer vessel, a discharge pipe, a first spring check valve, a second spring check valve, and a third spring check valve. The inner vessel contains a superconducting coil and liquid coolant to cool the superconducting coil. The outer vessel is thermally insulated from the inner vessel and holds the inner vessel in the outer vessel. The discharge pipe discharges, to an outside of the outer vessel, coolant gas generated by evaporation of the liquid coolant in the inner vessel. Each of the first spring check valve, the second spring check valve, and the third spring check valve is disposed in the discharge pipe. The discharge pipe includes a first split-flow pipe and a second split-flow pipe that are connected in parallel to each other, and the second split-flow pipe is larger in diameter than the first split-flow pipe. A part of the second split-flow pipe is branched into at least a first branch pipe and a second branch pipe. The first spring check valve is disposed in the first split-flow pipe to open when a pressure difference between an upstream side and a downstream side of the first spring check valve in the first split-flow pipe becomes more than or equal to a first set pressure higher than atmospheric pressure. The second spring check valve is disposed in the first branch pipe to open when a pressure difference between an upstream side and a downstream side of the second spring check valve in the first branch pipe becomes more than or equal to a second set pressure higher than the first set pressure. The third spring check valve is disposed in the second branch pipe to open when a pressure difference between an upstream side and a downstream side of the third spring check valve in the second branch pipe becomes more than or equal to a third set pressure higher than the first set pressure. The second branch pipe is different from the first branch pipe in terms of at least one of diameter, length, and inner volume.

Advantageous Effects of Invention

In accordance with the present invention, a part of the second split-flow pipe is branched into the first branch pipe and the second branch pipe, and therefore, the increase, over an elapsed time, of the flow rate of coolant gas flowing into each of the first branch pipe and the second branch pipe can be reduced, and accordingly, the peak pressure in the inner vessel can be reduced. Further, the second branch pipe in which the third spring check valve is disposed is different from the first branch pipe in which the second spring check valve is disposed, in terms of at least one of diameter, length, and inner volume, and accordingly, the timing at which the second spring check valve is actuated can be made different from the timing at which the third spring check valve is actuated. As a result, occurrence of the pressure variation can be suppressed. In this way, the maximum pressure in the inner vessel can be reduced, while the set pressure for each of the second spring check valve and the third spring check valve can be increased, to thereby reduce the amount of evaporated coolant during air transport or high-altitude-area transport.

BRIEF DESCRIPTION OF DRAWINGS

FIG. 2 is a partial cross-sectional view showing a configuration of a discharge pipe of a superconducting electromagnet according to a comparative example.

FIG. 3 is a graph showing change of the pressure in an inner vessel, from the time when a quench occurs in the superconducting electromagnet according to the comparative example.

FIG. 4 is a graph showing the pressure at which a second spring check valve starts opening in the superconducting electromagnet according to the comparative example, during normal-altitude-area transport and during air transport or high-altitude-area transport.

FIG. 5 is a graph showing change of the pressure in an inner vessel, from the time when a quench occurs in the superconducting electromagnet according to Embodiment 1 of the present invention.

DESCRIPTION OF EMBODIMENTS

Figure 1:
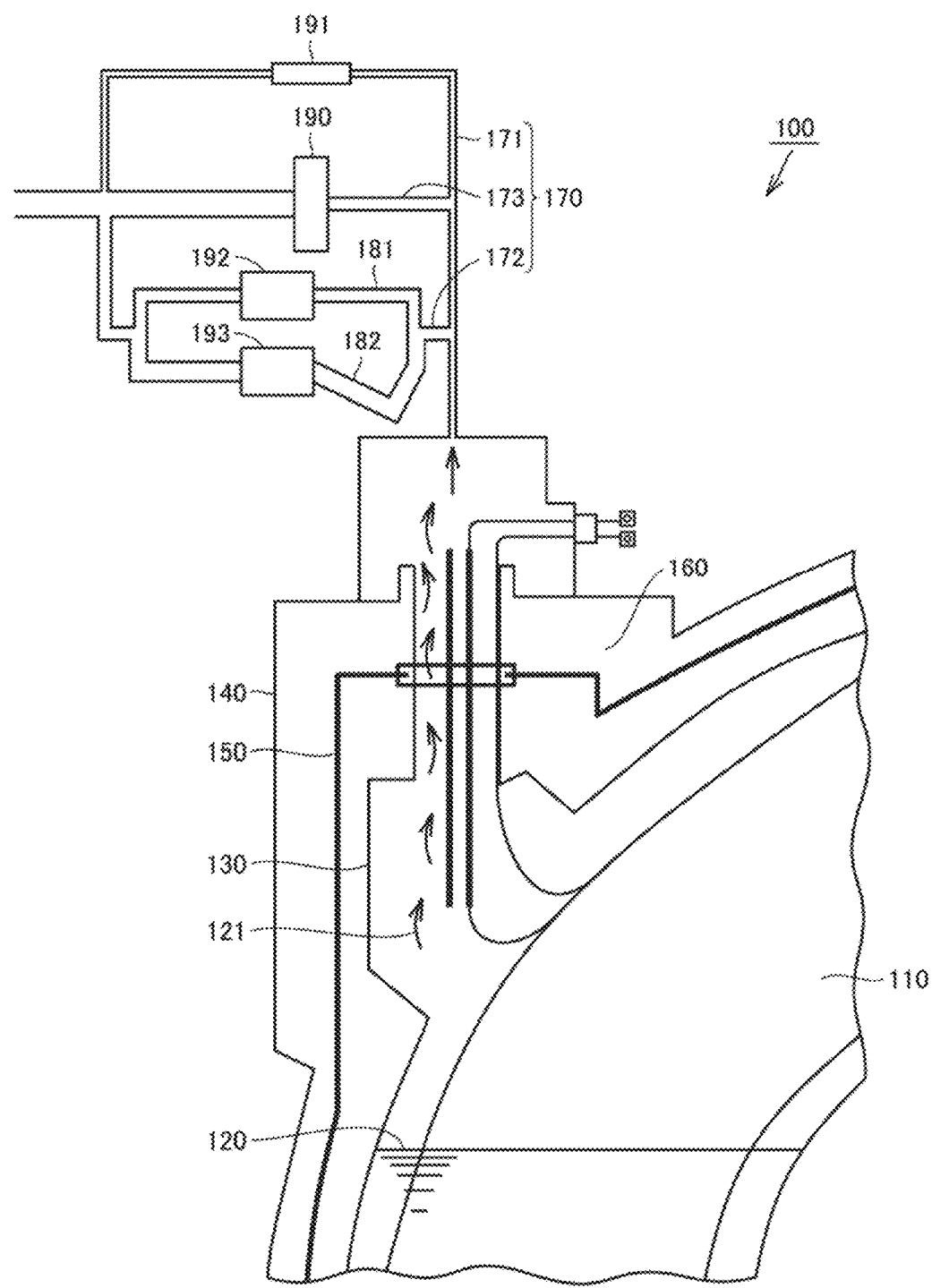
FIG. 1 is a partial cross-sectional view showing a configuration of a superconducting electromagnet according to Embodiment 1 of the present invention.

A superconducting electromagnet according to each embodiment of the present invention is described hereinafter with reference to the drawings. In the following description of the embodiments, the same or corresponding parts are denoted by the same reference characters, and a description thereof is not herein repeated.

Embodiment 1

FIG. 1 is a partial cross-sectional view showing a configuration of a superconducting electromagnet according to Embodiment 1 of the present invention. As shown in FIG. 1, superconducting electromagnet 100 according to Embodiment 1 of the present invention includes an inner vessel 130, an outer vessel 140, a discharge pipe 170, a first spring check valve 191, a second spring check valve 192, and a third spring check valve 193. In the present embodiment, superconducting electromagnet 100 further includes a rupture disk 190.

Inner vessel 130 contains a superconducting coil 110 and liquid coolant 120 to cool superconducting coil 110. While coolant 120 is helium in the present embodiment, coolant 120 is not limited to helium, but may be nitrogen.

Outer vessel 140 is thermally insulated from inner vessel 130 and holds inner vessel 130 in the outer vessel. The space between outer vessel 140 and inner vessel 130 is kept vacuum. Between outer vessel 140 and inner vessel 130, a radiation shield 150 is disposed to cover the outer surface of inner vessel 130. Between radiation shield 150 and outer vessel 140, a superinsulator 160 is disposed.

Discharge pipe 170 discharges, to the outside of outer vessel 140, coolant gas 121 generated by evaporation of the liquid coolant in inner vessel 130. Specifically, discharge pipe 170 has one end connected to a lid that covers a connection port in which a connection wire is located for connecting superconducting coil 110 to an external power source. The lid is placed on the outer circumferential surface of outer vessel 140. The other end of discharge pipe 170 is opened to the outside.

Discharge pipe 170 includes a first split-flow pipe 171 and a second split-flow pipe 172 that are connected in parallel to each other, and second split-flow pipe 172 is larger in diameter than first split-flow pipe 171. Discharge pipe 170 further includes a third split-flow pipe 173. Third split-flow pipe 173 is connected in parallel to first split-flow pipe 171 and second split-flow pipe 172, and larger in diameter than first split-flow pipe 171. The diameter of first split-flow pipe 171 is 15 mm or less, for example.

A part of second split-flow pipe 172 is branched into at least a first branch pipe 181 and a second branch pipe 182. In the present embodiment, a part of second split-flow pipe 172 is branched into first branch pipe 181 and second branch pipe 182.

Second branch pipe 182 is different from first branch pipe 181 in terms of at least one of diameter, length, and inner volume. In the present embodiment, second branch pipe 182 is larger in diameter, length, and inner volume than first branch pipe 181. The remaining part of second split-flow pipe 172 has the same diameter as first branch pipe 181.

The diameter of first branch pipe 181 is 20 mm or more and 40 mm or less, for example. The diameter of second branch pipe 182 is 1.5 times as large as the diameter of first branch pipe 181, for example. The length of second branch pipe 182 is more than or equal to 1.2 times as large as the length of first branch pipe 181, for example.

First spring check valve 191, second spring check valve 192, and third spring check valve 193 are each disposed in discharge pipe 170.

First spring check valve 191 is disposed in first split-flow pipe 171, and opened when a pressure difference between an upstream side and a downstream side of first spring check valve 191 in first split-flow pipe 171 becomes more than or equal to a first set pressure P1 which is higher than atmospheric pressure PA. First set pressure P1 is higher than atmospheric pressure PA and less than or equal to 1.1 times as high as atmospheric pressure PA.

Second spring check valve 192 is disposed in first branch pipe 181, and opened when a pressure difference between an upstream side and a downstream side of second spring check valve 192 in first branch pipe 181 becomes more than or equal to a second set pressure P2 higher than first set pressure P1. Second set pressure P2 is more than or equal to 1.25 times as high as atmospheric pressure PA, for example.

Third spring check valve 193 is disposed in second branch pipe 182, and opened when a pressure difference between an upstream side and a downstream side of third spring check valve 193 in second branch pipe 182 becomes more than or equal to a third set pressure P3 higher than first set pressure P1. In the present embodiment, second set pressure P2 and third set pressure P3 are equal to each other.

Rupture disk 190 is disposed in third split-flow pipe 173, and ruptured when a pressure difference between an upstream side and a downstream side of rupture disk 190 in third split-flow pipe 173 becomes more than a threshold value PS, to accordingly open third split-flow pipe 173 and thereby prevent abnormal increase of the pressure in inner vessel 130. Threshold value PS is larger than each of second set pressure P2 and third set pressure P3.

A refrigerator for superconducting electromagnet 100 is stopped during transport of superconducting electromagnet 100 and, during this transport, the pressure in inner vessel 130 is less than second set pressure P2, only first spring check valve 191 is open among first spring check valve 191, second spring check valve 192, and third spring check valve 193, and rupture disk 190 is not ruptured. Accordingly, first split-flow pipe 171 functions as a discharge path for coolant gas 121 during the transport.

When a quench of superconducting electromagnet 100 occurs, the pressure in inner vessel 130 is higher than each of second set pressure P2 and third set pressure P3 and less than or equal to threshold value PS. Accordingly, all of first spring check valve 191, second spring check valve 192, and third spring check valve 193 are open and rupture disk 190 is not ruptured. Because first split-flow pipe 171 is smaller in diameter than second split-flow pipe 172, coolant gas 121 mainly flows into second split-flow pipe 172. Accordingly, second split-flow pipe 172 functions as a discharge path for coolant gas 121 when a quench occurs.

In order to describe functions and effects of discharge pipe 170 of superconducting electromagnet 100 according to Embodiment 1 of the present invention, a description is given, with reference to drawings, of a discharge pipe of a superconducting electromagnet according to a comparative example. The superconducting electromagnet according to the comparative example differs from superconducting electromagnet 100 according to Embodiment 1 of the present invention, in terms of only the configuration of the discharge pipe.

FIG. 2 is a partial cross-sectional view showing a configuration of a discharge pipe of a superconducting electromagnet according to a comparative example. As shown in FIG. 2, discharge pipe 970 of superconducting electromagnet 900 according to the comparative example includes a first split-flow pipe 171 and a second split-flow pipe 972 that are connected in parallel to each other, and second split-flow pipe 972 is larger in diameter than first split-flow pipe 171. Discharge pipe 970 further includes a third split-flow pipe 173. Third split-flow pipe 173 is connected in parallel to first split-flow pipe 171 and second split-flow pipe 972, and larger in diameter than first split-flow pipe 171. The diameter of first split-flow pipe 171 is 15 mm or less, for example. The diameter of each of second split-flow pipe 972 and third split-flow pipe 173 is 20 mm or more and 40 mm or less, for example.

A first spring check valve 191 is disposed in first split-flow pipe 171, a second spring check valve 192 is disposed in second split-flow pipe 972, and a rupture disk 190 is disposed in third split-flow pipe 173.

A superconducting state of superconducting electromagnet 900 can be maintained by balancing the amount of current through superconducting coil 110, the cooling temperature for superconducting coil 110, and the magnetic field generated by superconducting coil 110. A quench of superconducting electromagnet 900 is a phenomenon where the superconducting state is terminated due to an electrical factor and a thermal factor or the like, causing superconducting coil 110 to make a transition to a normal conducting state. When a quench of superconducting electromagnet 900 occurs, an electrical resistance of superconducting coil 110 is suddenly generated to cause superconducting coil 110 to generate heat.

In superconducting electromagnet 900 for MRI (Magnetic Resonance Imaging), within such a short time as less than five seconds from occurrence of a quench, heat is generated from superconducting coil 110 to produce a thermal energy of approximately 3 MJ. The thermal energy is transported as a latent heat of evaporation of liquid coolant 120 and a sensible heat for a temperature rise of coolant gas 121. Generated coolant gas 121 causes the pressure in inner vessel 130 to rise in a short time, and therefore, it is necessary to discharge coolant gas 121 to the outside while suppressing increase of the fluid resistance in discharge pipe 970. Meanwhile, during a normal operation of superconducting electromagnet 900, it is necessary to suppress flow of the outside air and heat into inner vessel 130, in order to maintain a low-temperature state of superconducting coil 110.

In superconducting electromagnet 900 according to the comparative example, second split-flow pipe 972 functions as a discharge path for coolant gas 121 when a quench occurs. Therefore, regarding second split-flow pipe 972, in order to reduce the fluid resistance including a pressure loss at second spring check valve 192 and suppress inflow of heat from second split-flow pipe 972, the length and the diameter of second split-flow pipe 972 are reduced while the thickness of second split-flow pipe 972 is also reduced to ensure a proper flow path area for coolant gas 121.

FIG. 3 is a graph showing change of the pressure in an inner vessel, from the time when a quench occurs in the superconducting electromagnet according to the comparative example. FIG. 3 shows, on the vertical axis, the pressure in inner vessel 130 and shows, on the horizontal axis, the elapsed time from occurrence of the quench.

As shown in FIG. 3, in superconducting electromagnet 900 according to the comparative example, the speed at which second spring check valve 192 is opened is slower than the speed at which coolant gas 121 is generated immediately after occurrence of the quench, and therefore, the pressure in inner vessel 130 reaches a peak pressure 13 that is higher by 30% to 50% than a second set pressure A at which second spring check valve 192 starts opening.

After peak pressure B is reached, a pressure variation C occurs in inner vessel 130, i.e., a pressure decrease resultant from opening of second spring check valve 192 and a pressure increase resultant from closing of second spring check valve 192 in response to the pressure decrease are alternately repeated. Peak pressure B and the maximum pressure of pressure variation C have to be kept less than or equal to an allowable pressure of inner vessel 130, and therefore, second set pressure A, which is a spring force when second spring check valve 192 starts opening, cannot be set high.

Second spring check valve 192 is opened when the pressure in inner vessel 130 becomes larger than the sum of the spring force of second spring check valve 192 and the outside air pressure. Specifically, second set pressure A for second spring check valve 192 is the spring force when second spring check valve 192 is closed. The outside air pressure of a high-altitude area is lower than the outside air pressure of a normal-altitude area.

FIG. 4 is a graph showing the pressure at which a second spring check valve starts opening in the superconducting electromagnet according to the comparative example, during normal-altitude-area transport and during air transport or high-altitude-area transport. FIG. 4 shows, on the vertical axis, the pressure in inner vessel 130, and shows, on the horizontal axis, normal-altitude-area transport, and air transport or high-altitude-area transport, for the superconducting electromagnet.

A refrigerator for superconducting electromagnet 900 is stopped during transport of superconducting electromagnet 900 and, as shown in FIG. 4, during normal-altitude-area transport, second spring check valve 192 is opened when the pressure in inner vessel 130 becomes larger than the sum F of second set pressure A for second spring check valve 192 and the outside air pressure D of the normal-altitude area. In contrast, during air transport or high-altitude-area transport, second spring check valve 192 is opened when the pressure in inner vessel 130 becomes larger than the sum G of second set pressure A for second spring check valve 192 and the outside air pressure D' of the high-altitude area. Thus, second spring check valve 192 is opened at the pressure that is lower by the pressure difference E between the outside air pressure D and the outside air pressure D'. Accordingly, the amount of evaporated coolant 120 during air transport or high-altitude-area transport of superconducting electromagnet 900 increases, relative to the one during normal-altitude-area transport. When second set pressure A for second spring check valve 192 is lower, the amount of evaporated coolant 120 further increases.

FIG. 5 is a graph showing change of the pressure in the inner vessel, from the time when a quench occurs in the superconducting electromagnet according to Embodiment 1 of the present invention. FIG. 5 shows, on the vertical axis, the pressure in inner vessel 130 and shows, on the horizontal axis, the elapsed time from occurrence of the quench.

In superconducting electromagnet 100 according to Embodiment 1 of the present invention, a part of second split-flow pipe 172 is branched into first branch pipe 181 and second branch pipe 182, so that the amount of increase, over the elapsed time, of the flow rate of coolant gas 121 flowing into each of first branch pipe 181 and second branch pipe 182 can be reduced. Therefore, as shown in FIG. 5, a peak pressure B' in inner vessel 130 can be made lower than peak pressure B.

Further, second branch pipe 182 in which third spring check valve 193 is disposed is different from first branch pipe 181 in which second spring check valve 192 is disposed, in terms of at least one of diameter, length, and inner volume, so that the timing at which second spring check valve 192 is actuated can be made different from the timing at which third spring check valve 193 is actuated. As a result, occurrence of the pressure variation C can be suppressed.

In this way, the maximum pressure in inner vessel 130 can be reduced, while second set pressure P for second spring check valve 192 and third set pressure P3 for third spring check valve 193 can be increased to a set pressure A' higher than second set pressure A of the comparative example, to thereby reduce the amount of evaporated coolant 120 during air transport or high-altitude-area transport.

For superconducting electromagnet 100 according to Embodiment 1 of the present invention, first set pressure P1 is less than or equal to 1.1 times as high as atmospheric pressure, and second set pressure P2 is more than or equal to 1.25 times as high as atmospheric pressure. Accordingly, it is possible to allow first split-flow pipe 171 to function as a discharge path for coolant gas 121 during transport, and also allow second split-flow pipe 172 to effectively function as a discharge path for coolant gas 121 when a quench occurs.

Regarding superconducting electromagnet 100 according to Embodiment 1 of the present invention, third set pressure P3 is equal to second set pressure P2. Accordingly, a spring check valve with the same specifications as second spring check valve 192 can be employed as third spring check valve 193, which facilitates manufacture of superconducting electromagnet 100.

Embodiment 2

A superconducting electromagnet according to Embodiment 2 of the present invention is described hereinafter. The superconducting electromagnet according to Embodiment 2 of the present invention differs from superconducting electromagnet 100 according to Embodiment 1 thereof only in terms of the configuration of the third spring check valve, and therefore, the description of features similar to those of superconducting electromagnet 100 according to Embodiment 1 is not herein repeated.

Figure 6:
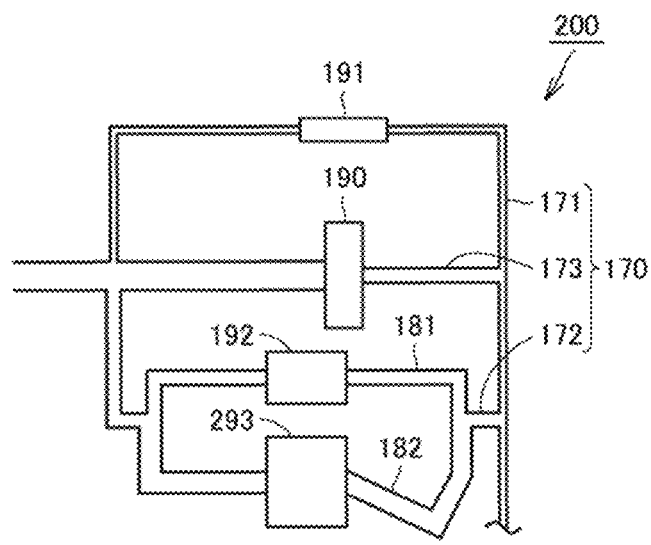
FIG. 6 is a partial cross-sectional view showing a configuration of a discharge pipe of a superconducting electromagnet according to Embodiment 2 of the present invention.

FIG. 6 is a partial cross-sectional view showing a configuration of a discharge pipe of a superconducting electromagnet according to Embodiment 2 of the present invention. As shown in FIG. 6, in superconducting electromagnet 200 according to Embodiment 2 of the present invention, a third spring check valve 293 is disposed in second branch pipe 182.

Third spring check valve 293 is opened when the pressure difference between an upstream side and a downstream side of third spring check valve 293 in second branch pipe 182 becomes more than or equal to third set pressure P3 that is higher than first set pressure P1. In the present embodiment, third set pressure P3 is higher than second set pressure P2. For example, third set pressure P3 is 1.1 times as high as second set pressure P2.

In superconducting electromagnet 200 according to Embodiment 2 of the present invention, the timing at which second spring check valve 192 is actuated can be made significantly different from the timing at which third spring check valve 193 is actuated, to effectively suppress occurrence of pressure variation C. Moreover, because third set pressure P3 can be made higher than that for superconducting electromagnet 100 of Embodiment 1, the maximum pressure in inner vessel 130 can be reduced and the amount of evaporated coolant 120 during air transport or high-altitude-area transport can further be reduced.

Embodiment 3

A superconducting electromagnet according to Embodiment 3 of the present invention is described hereinafter. The superconducting electromagnet according to Embodiment 3 of the present invention differs from superconducting electromagnet 100 according to Embodiment 1 thereof only in that the former further includes a third branch pipe and a fourth spring check valve, and therefore, the description of features similar to those of superconducting electromagnet 100 according to Embodiment 1 of the present invention is not repeated herein.

Figure 7:
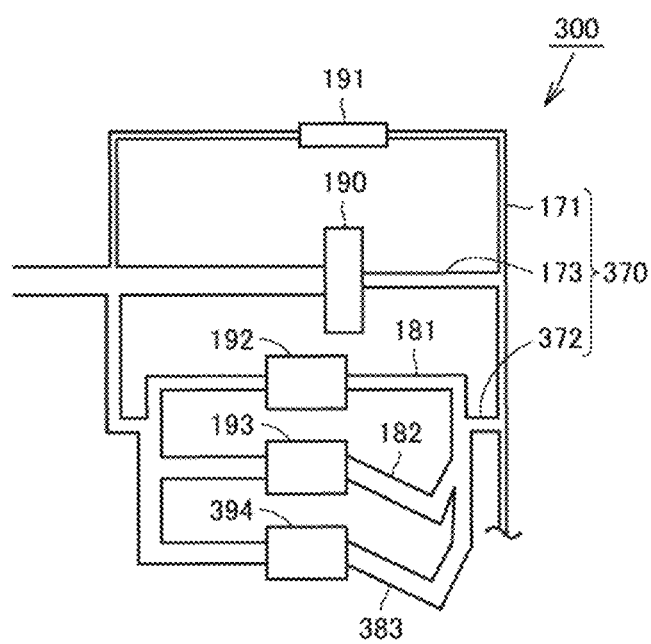
FIG. 7 is a partial cross-sectional view showing a configuration of a discharge pipe of a superconducting electromagnet according to Embodiment 3 of the present invention.

FIG. 7 is a partial cross-sectional view showing a configuration of a discharge pipe of the superconducting electromagnet according to Embodiment 3 of the present invention. As shown in FIG. 7, in superconducting electromagnet 300 according to Embodiment 3 of the present invention, discharge pipe 370 includes a first split-flow pipe 171 and a second split-flow pipe 372 connected in parallel to first split-flow pipe 171 and larger in diameter than first split-flow pipe 171. Discharge pipe 370 further includes a third split-flow pipe 173. A part of second split-flow pipe 372 is branched into a first branch pipe 181, a second branch pipe 182, and a third branch pipe 383.

Third branch pipe 383 differs from first branch pipe 181 in terms of at least one of diameter, length and inner volume. In the present embodiment, third branch pipe 383 is larger in diameter, length, and inner volume than first branch pipe 181. The diameter of third branch pipe 383 is 1.5 times as large as the diameter of first branch pipe 181, for example. The length of third branch pipe 383 is more than or equal to 1.2 times as long as the length of first branch pipe 181.

Superconducting electromagnet 300 according to Embodiment 3 of the present invention further includes a fourth spring check valve 394 disposed in third branch pipe 383. Fourth spring check valve 394 is opened when the pressure difference between an upstream side and a downstream side of fourth spring check valve 394 in third branch pipe 383 becomes more than or equal to a fourth set pressure P4 that is equal to second set pressure P2.

In superconducting electromagnet 300 according to Embodiment 3 of the present invention, a part of second split-flow pipe 372 is branched into three pipes, which, however, may be four or more pipes. When a part of second split-flow pipe 372 is branched into four or more branch pipes, each of the branch pipes differs from first branch pipe 181 in terms of at least one of diameter, length, and inner volume. In each branch pipe, a spring check valve is disposed that is opened when the pressure becomes more than or equal to a set pressure equal to second set pressure P2.

In superconducting electromagnet 300 according to Embodiment 3 of the present invention, a part of second split-flow pipe 372 is branched into first branch pipe 181, second branch pipe 182, and third branch pipe 383, so that the amount of increase, over the elapsed time, of the flow rate of coolant gas 121 flowing into each of first branch pipe 181, second branch pipe 182, and third branch pipe 383 can be reduced. Therefore, the peak pressure in inner vessel 130 can be made lower than peak pressure B' of superconducting electromagnet 100 according to Embodiment 1.

In superconducting electromagnet 300 according to Embodiment 3 of the present invention, respective timings at which second spring check valve 192, third spring check valve 193, and fourth spring check valve 394 are actuated can be made different from each other, to thereby suppress occurrence of pressure variation C effectively.

In this way, the maximum pressure in inner vessel 130 can be reduced, while each of second set pressure P2 for second spring check valve 192, third set pressure P3 for third spring check valve 193, and fourth set pressure P4 for fourth spring check valve 394 can be made higher than each of second set pressure P2 and third set pressure P3 for superconducting electromagnet 100 of Embodiment 1, to thereby reduce the amount of evaporated coolant 120 during air transport or high-altitude-area transport.

Embodiment 4

A superconducting electromagnet according to Embodiment 4 of the present invention is described hereinafter. The superconducting electromagnet according to Embodiment 4 of the present invention differs from superconducting electromagnet 300 according to Embodiment 3 thereof only in terms of the configuration of the fourth spring check valve, and therefore, the description of features similar to those of superconducting electromagnet 300 according to Embodiment 3 of the present invention is not repeated herein.

Figure 8:
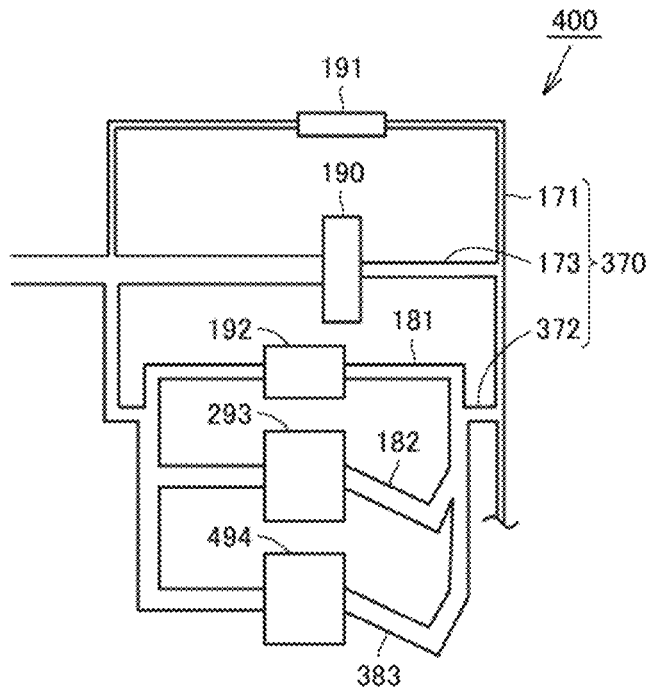
FIG. 8 is a partial cross-sectional view showing a configuration of a discharge pipe of a superconducting electromagnet according to Embodiment 4 of the present invention.

FIG. 8 is a partial cross-sectional view showing a configuration of a discharge pipe of the superconducting electromagnet according to Embodiment 4 of the present invention. As shown in FIG. 8, a fourth spring check valve 494 is disposed in third branch pipe 383 in superconducting electromagnet 400 according to Embodiment 4 of the present invention.

Fourth spring check valve 494 is opened when the pressure difference between an upstream side and a downstream side of fourth spring check valve 494 in third branch pipe 383 becomes more than or equal to a fourth set pressure P4 that is higher than second set pressure P2. For example, fourth set pressure P4 is 1.1 time as high as second set pressure P2.

In superconducting electromagnet 400 according to Embodiment 4 of the present invention, the timing at which second check valve 192 is actuated can be made significantly different from the timing at which third spring check valve 193 and fourth spring check valve 494 are actuated, to effectively suppress occurrence of pressure variation C. Moreover, because each of third set pressure P3 and fourth set pressure P4 can be made higher than that for superconducting electromagnet 300 of Embodiment 3, the maximum pressure in inner vessel 130 can be reduced and the amount of evaporated coolant 120 during air transport or high-altitude-area transport can further be reduced.

Embodiment 5

A superconducting electromagnet according to Embodiment 5 of the present invention is described hereinafter. The superconducting electromagnet according to Embodiment 5 of the present invention differs from superconducting electromagnet 100 according to Embodiment 1 thereof only in that the former further includes a throttle, and therefore, the description of features similar to those of superconducting electromagnet 100 according to Embodiment 1 of the present invention is not repeated herein.

Figure 9:
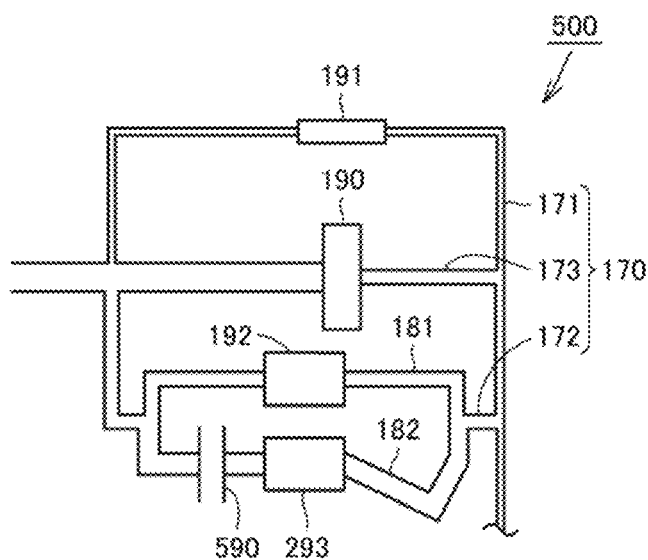
FIG. 9 is a partial cross-sectional view showing a configuration of a discharge pipe of a superconducting electromagnet according to Embodiment 5 of the present invention.

FIG. 9 is a partial cross-sectional view showing a configuration of a discharge pipe of the superconducting electromagnet according to Embodiment 5 of the present invention. As shown in FIG. 9, in superconducting electromagnet 500 according to Embodiment 5 of the present invention, a throttle 590 is located downstream of third spring check valve 293 in second branch pipe 182. Throttle 590 reduces a flow channel area for coolant gas 121 in a part of second branch pipe 182. Throttle 590 is an orifice or ball valve, for example.

In superconducting electromagnet 500 according to Embodiment 5 of the present invention, throttle 590 increases the fluid resistance in second branch pipe 182 to reduce the frequency of the open-close operation of third spring check valve 293, and accordingly, occurrence of pressure variation C can be suppressed effectively. Moreover, because third set pressure P3 can be made higher than that for superconducting electromagnet 100 according to Embodiment 1, the maximum pressure in inner vessel 130 can be reduced, while the amount of evaporated coolant 120 during air transport or high-altitude area transport can further be reduced.

Features that can be combined in the above-described embodiments may be combined in any way.

The above embodiments disclosed herein are given by way of illustration in all respects, not for supporting limited interpretation. The technical scope of the present invention should therefore not be interpreted based solely on the above embodiments. It also encompasses all modifications and variations equivalent in meaning and scope to the claims.

REFERENCE SIGNS LIST

100, 200, 300, 400, 500, 900 superconducting electromagnet; 110 superconducting coil; 120 coolant; 121 coolant gas; 130 inner vessel; 140 outer vessel; 150 radiation shield; 160 superinsulator; 170, 370, 970 discharge pipe; 171 first split-flow pipe; 172, 372, 972 second split-flow pipe; 173 third split-flow pipe; 181 first branch pipe; 182 second branch pipe; 190 rupture disk; 191, 192, 193, 293, 394, 494 check valve; 383 third branch pipe; 590 throttle; B peak pressure; C pressure variation; D outside air pressure; E pressure difference; P1 first set pressure; P2 second set pressure; P3 third set pressure; P4 fourth set pressure; PA atmospheric pressure; PS threshold value

The invention claimed is:

1. A superconducting electromagnet comprising:
an inner vessel containing a superconducting coil and liquid coolant to cool the superconducting coil;
an outer vessel thermally insulated from the inner vessel and holding the inner vessel in the outer vessel;
a discharge pipe to discharge, to an outside of the outer vessel, coolant gas generated by evaporation of the liquid coolant in the inner vessel; and
a first spring check valve, a second spring check valve, and a third spring check valve that are disposed in the discharge pipe, wherein
the discharge pipe includes a first split-flow pipe and a second split-flow pipe that are connected in parallel to each other, wherein the second split-flow pipe is larger in diameter than the first split-flow pipe,
a part of the second split-flow pipe is branched into at least a first branch pipe and a second branch pipe,
the first spring check valve is disposed in the first split-flow pipe to open when a pressure difference between an upstream side and a downstream side of the first spring check valve in the first split-flow pipe becomes more than or equal to a first set pressure higher than atmospheric pressure,
the second spring check valve is disposed in the first branch pipe to open when a pressure difference between an upstream side and a downstream side of the second spring check valve in the first branch pipe becomes more than or equal to a second set pressure higher than the first set pressure,
the third spring check valve is disposed in the second branch pipe to open when a pressure difference between an upstream side and a downstream side of the third spring check valve in the second branch pipe becomes more than or equal to a third set pressure higher than the first set pressure, and
the second branch pipe is different from the first branch pipe in terms of at least one of diameter, length, and inner volume.

2. The superconducting electromagnet according to claim 1, wherein
the first set pressure is less than or equal to 1.1 times as high as atmospheric pressure, and
the second set pressure is more than or equal to 1.25 times as high as atmospheric pressure.

3. The superconducting electromagnet according to claim 1, wherein the third set pressure is equal to the second set pressure.

4. The superconducting electromagnet according to claim 1, wherein the third set pressure is higher than the second set pressure.

5. The superconducting electromagnet according to claim 3, wherein
the part of the second split-flow pipe is branched into the first branch pipe, the second branch pipe, and a third branch pipe,
the superconducting electromagnet further comprises a fourth spring check valve disposed in the third branch pipe,
the fourth spring check valve opens when a pressure difference between an upstream side and a downstream side of the fourth spring check valve in the third branch pipe becomes more than or equal to a fourth set pressure equal to the second set pressure, and
the third branch pipe is different from the first branch pipe in terms of at least one of diameter, length, and inner volume.

6. The superconducting electromagnet according to claim 4, wherein
the part of the second split-flow pipe is branched into the first branch pipe, the second branch pipe, and a third branch pipe,
the superconducting electromagnet further comprises a fourth spring check valve disposed in the third branch pipe,
the fourth spring check valve opens when a pressure difference between an upstream side and a downstream side of the fourth spring check valve in the third branch pipe becomes more than or equal to a fourth set pressure higher than the second set pressure, and
the third branch pipe is different from the first branch pipe in terms of at least one of diameter, length, and inner volume.

7. The superconducting electromagnet according to claim 3, further comprising a throttle located downstream of the third spring check valve in the second branch pipe, to reduce a flow channel area for the coolant gas in the part of the second branch pipe.

8. The superconducting electromagnet according to claim 2, wherein the third set pressure is equal to the second set pressure.

9. The superconducting electromagnet according to claim 2, wherein the third set pressure is higher than the second set pressure.

10. The superconducting electromagnet according to claim 8, wherein
the part of the second split-flow pipe is branched into the first branch pipe, the second branch pipe, and a third branch pipe,
the superconducting electromagnet further comprises a fourth spring check valve disposed in the third branch pipe,
the fourth spring check valve opens when a pressure difference between an upstream side and a downstream side of the fourth spring check valve in the third branch pipe becomes more than or equal to a fourth set pressure equal to the second set pressure, and
the third branch pipe is different from the first branch pipe in terms of at least one of diameter, length, and inner volume.

11. The superconducting electromagnet according to claim 9, wherein
- the part of the second split-flow pipe is branched into the first branch pipe, the second branch pipe, and a third branch pipe,
- the superconducting electromagnet further comprises a fourth spring check valve disposed in the third branch pipe,
- the fourth spring check valve opens when a pressure difference between an upstream side and a downstream side of the fourth spring check valve in the third branch pipe becomes more than or equal to a fourth set pressure higher than the second set pressure, and
- the third branch pipe is different from the first branch pipe in terms of at least one of diameter, length, and inner volume.

12. The superconducting electromagnet according to claim 8, further comprising a throttle located downstream of the third spring check valve in the second branch pipe, to reduce a flow channel area for the coolant gas in the part of the second branch pipe.

* * * * *